United States Patent
Rangapuram et al.

(10) Patent No.: US 10,409,521 B1
(45) Date of Patent: *Sep. 10, 2019

(54) BLOCK-BASED BACKUPS FOR LARGE-SCALE VOLUMES

(71) Applicant: EMC IP Holding Company LLC, Hopkinton, MA (US)

(72) Inventors: Ravi Rangapuram, Bangalore (IN); Pavan Kumar Dattatreya Ati, Bangalore (IN); Sridhar Surampudi, Rajahmundry (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/581,211

(22) Filed: Apr. 28, 2017

(51) Int. Cl.
G06F 3/06 (2006.01)

(52) U.S. Cl.
CPC ............ *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | | |
|---|---|---|---|---|
| 7,191,198 B2 * | 3/2007 | Asano | ........... | G06F 11/2007 |
| 8,473,463 B1 * | 6/2013 | Wilk | ........... | G06F 11/1453 707/647 |
| 8,589,336 B1 * | 11/2013 | Levy | ........... | G06F 3/0484 707/602 |
| 8,600,937 B1 * | 12/2013 | Ravan | ........... | G06F 11/1456 707/610 |
| 8,621,165 B1 * | 12/2013 | Sridharan | ........... | G06F 11/1435 707/644 |
| 8,904,125 B1 * | 12/2014 | Elling | ........... | G06F 11/1451 711/162 |
| 9,171,002 B1 * | 10/2015 | Mam | ........... | G06F 3/06 |
| 2006/0020640 A1 * | 1/2006 | Suzuki | ........... | G06F 3/0605 |
| 2007/0088702 A1 * | 4/2007 | Fridella | ........... | H04L 29/12169 |
| 2009/0307422 A1 * | 12/2009 | Galloway | ........... | G06F 11/1076 711/114 |
| 2010/0077165 A1 * | 3/2010 | Lu | ........... | G06F 11/1451 711/162 |
| 2010/0318757 A1 * | 12/2010 | Beeken | ........... | G06F 11/1456 711/162 |
| 2011/0047340 A1 * | 2/2011 | Olson | ........... | G06F 11/1456 711/162 |

(Continued)

*Primary Examiner* — Mano Padmanabhan
*Assistant Examiner* — William E. Baughman
(74) *Attorney, Agent, or Firm* — Staniford Tomita LLP

(57) ABSTRACT

Embodiments are directed to a method of performing block based backups for large-scale source volumes, by obtaining a total source volume size to determine if the source volume exceeds 64 TB, creating a number of sub-volumes to divide the total source volume into discrete sub-volumes of 64 TB each, grouping the discrete sub-volumes into a container, and storing, upon a read operation for a block based backup operation, each block of the source volume into a corresponding sub-volume of the sub-volumes. The method determines a block number and offset of each block and derives the corresponding sub-volume from the offset. Each sub-volume represents an individual saveset of the backup operation, and the container manages the individual saveset for the block based backup operation.

20 Claims, 6 Drawing Sheets

(56) References Cited

U.S. PATENT DOCUMENTS

| | | | | |
|---|---|---|---|---|
| 2011/0246731 | A1* | 10/2011 | Ninose | G06F 11/1451 711/162 |
| 2011/0252208 | A1* | 10/2011 | Ali | G06F 11/1451 711/162 |
| 2012/0284707 | A1* | 11/2012 | Janakiraman | G06F 3/0607 718/1 |
| 2013/0073820 | A1* | 3/2013 | Watanabe | G06F 3/0611 711/162 |
| 2015/0347430 | A1* | 12/2015 | Ghosh | G06F 16/188 707/649 |
| 2017/0060431 | A1* | 3/2017 | Kochunni | G06F 3/0605 |
| 2017/0289290 | A1* | 10/2017 | Bhagwat | H04L 67/2809 |

* cited by examiner

200

| PB 0 | PB 1 | PB 2 | PB 3 | SB 0 | PB 4 | PB 5 | PB 6 | PB 7 | SB 1 |

PB Entry for Payload Block
SB Entry for Sector Bitmap Block

Container (Cover set)

| Parent or Full (0 TB – 64 TB) | Parent or Full (65 TB – 128 TB) | Parent or Full (129 TB – 192 TB) | Parent or Full (193 TB – 256 TB) |
| VHDx - 1 | VHDx - 2 | VHDx - 3 | VHDx - 4 |

Container (Cover set)

| Virtual Full (0 TB – 64 TB) | Virtual Full (65 TB – 128 TB) | Virtual Full (129 TB – 192 TB) | Virtual Full (193 TB – 256 TB) |
| VHDx - 1 | VHDx - 2 | VHDx - 3 | VHDx - 4 |

FIG. 4

BLOCK-BASED BACKUPS FOR LARGE-SCALE VOLUMES

TECHNICAL FIELD

Embodiments are generally directed to networked-based data backup methods, and more specifically to performing block-based backups for volumes greater than 64 TB.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In standard computer systems, the file system (e.g., NTFS on Windows or ext3 for Linux) is responsible for keeping track of the tree or hierarchy of files. It also stores files in fixed-size blocks on the disk and keeps track of where these blocks are located. Backup applications that read files using the file system to access data are inherently slow. Block based backups (BBB) bypass files and file systems by reading directly from the disk or volume, thus they incur no performance penalty for even large numbers of files because the backup application reads blocks in their order on the disk, not the order that they appear in files. Block based backups also support point-in-time snapshots in which a backup is started by first taking a snapshot of the live running volume. They then read block level data from the snapshot not the actual disk. In general, block-based backups are many times faster for backup and restore operations, as compared to traditional file system based backup systems.

The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. One popular backup system, such as the EMC Networker Block Based Solution creates a backup image in VHDx containers. VHDx is a Hyper-V virtual hard disk (VHD) format found in Windows servers, and has a present storage capacity of 64 TB compared to standard VHD storage limits of 2 TB. A container is an image file that stores backups.

With respect to block based backups, systems such as EMC Networker creates a volume image in a VHDx container. The VHDx container is created on a disk type device like Data Domain, DD or advance file type device, AFTD. Full backups contain either all blocks or used blocks of the volume in VHDx. Incremental backups contain changed blocks embedded in the VHDx container. For file recovery, the system mounts the VHDx chain and user can copy the required files from mounted file system. During image recovery, it recovers the blocks from all backup images (i.e., from all backup levels). Each VHDx contains the required volume to be protected and additionally a system partition if required. At the virtual hard disk layer, the system can represent a large virtual disk only up to 64 TB. This means the maximum volume size plus VHDx metadata should not go beyond 64 TB. For volumes that are greater than 64 TB, the system does not support block based backups. This represents a significant limit on the availability of block based backups and forces backup systems to revert to file level backups for large volumes.

What is needed, therefore, is a block based backup system that supports volume sizes greater than 64 TB by extending the block based backup frame work when Data Domain or similar systems is used as the backed storage device.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 illustrates an example block allocation table layout for a certain example chunk ratio value.

FIG. 3 illustrates the division of a volume into 64 TB VHDx sub-volumes during level full backup under some embodiments.

FIG. 4 illustrates the division of a volume into 64 TB VHDx sub-volumes during an incremental backup under some embodiments.

DETAILED DESCRIPTION

Figure 1:
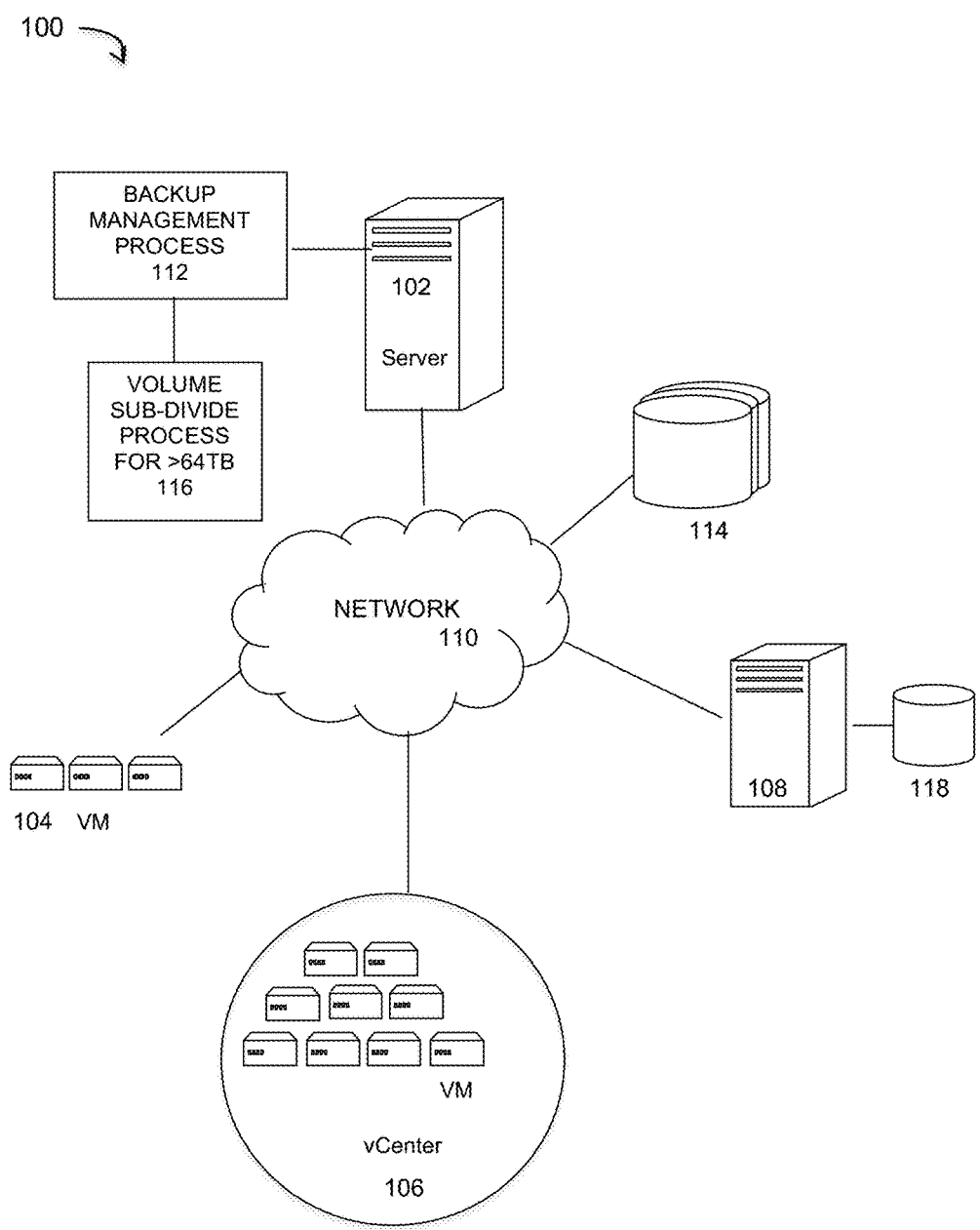
FIG. 1 is a diagram of a large-scale network implementing a block based backup system that performs file index backups, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a large-scale block based backup system for backing up volumes greater than 64 terabytes (TB) in Data Domain (DD) or similar systems. Such embodiments may be used in VM-based networks. Thus, as shown in FIG. 1, system 100 includes a number of VMs or groups of VMs 104 that are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114.

The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a data backup process that performs block based backups through a CBT component. The backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. System 100 also includes a process or system component 116 that backs up indexes along with the changed blocks in a manner that eliminates the remounting of volumes or file systems to perform data searches and other data access or processing operations.

In an embodiment, system 100 may represent a Data Domain Restorer (DDR)-based deduplication storage system, and storage server 102 may be implemented as a DDR Deduplication Storage server provided by EMC Corporation. In this case, the backup runs in the Networker client and after embedding changed blocks in VHDx format it sends the data to Networker storage node (Data domain). It should be noted, however, that other similar backup and storage systems are also possible. System 100 may utilize certain protocol-specific namespaces that are the external interface to applications and include NTFS (Windows file system), NTS (network file system) and CIFS (common internet file system) namespaces, among others.

In general, the systems and methods described herein operate with Windows-based operating system (OS) networks. Alternatively, embodiments may be used or adapted to be used with other OS systems, including virtual machine environments using hypervisors (e.g., Hyper-V) to create and run the virtual machines. These may include the Hyper-V hypervisor, which is a native hypervisor that creates VMs on Intel x86-64 based systems and is part of the Microsoft Windows server products. Thus, the block based backup feature works even with VMs created using any virtualization technology, including VMs created using VMware, as well as on the physical machines themselves.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

The backup methods described herein may be used to implement system backup sessions for full, incremental or differential backups or any combination of full and incremental or differential backups. A full backup backs up all files from a data source in a specified backup set or job, while an incremental backup backs up only changed and new files since the last backup. Incremental backup procedures may use a changed block tracking (CBT) feature that may be provided by the backup system, such as NetWorker. As such, it may be provided as a device driver sitting in the storage stack that monitors all the "block writes" on the volume.

The block based backup methods work at the volume level. In present systems, each VHDx contains a single volume. To support data recovery (DR), the system creates one VHDx for each volume and then restores all the volumes (VHDx files). Under the present VHDx limitation of 64 TB, this same limit applies to all the volumes stored inside VHDx. However, newer files systems, such as fifth generation file systems like ReFS, Zfs and Btrfs grow rapidly and can easily outrun the current VHDx limit of 64 TB. Embodiments are directed to a block level backup solution that supports these growing volume sizes.

In an embodiment of this new approach, the backup management process 112 of backup system 100 includes a volume partition process that divides each volume into sub volumes of 64 TB each in size and stores each sub volume as an individual VHDx. When reading the block from the source volume, the process shall know the block number/offset and based on this offset it stores the block in the corresponding VHDx. These individual sub volumes have an individual saveset ID during backup with a cover set ID managing these individual saveset In this approach, any volume of any size can seamlessly be backed up using the new volume partitioned BBB framework. This method fully utilizes the data domain capability of making virtual synthetic full backups.

The backup methods described herein may be used to implement system backup sessions for full, incremental or differential backups or any combination of full and incremental or differential backups. A full backup backs up all files from a data source in a specified backup set or job, while an incremental backup backs up only changed and new files since the last backup. Incremental backup procedures may use a changed block tracking (CBT) feature provided by a virtual machine monitor or manager to keep track of data blocks changed since last backup. For some embodiments, one or more differential or incremental backups for Hyper-V backups in which the data to be backed up is already in a virtual disk format, such as VHD/VHDx. The incremental backup virtual disks may be created after the creation of the file that stores the full backup information of a parent volume, and the incremental backup virtual disks may store only the changed blocks in the parent volume. The set of a full backup virtual disk and one or more incremental backup virtual disks may be saved together as a single virtual disk (e.g., VHDx) in a backup disk and can be mounted for recovery. The full backups and incremental backups comprise virtual disk files, which are merged to create full or artificially synthesized full backups.

VHDx Format Overview

On the Microsoft Windows 2012 and later versions, the operating system has in built support to create/mount VHDx type files. The VHDx format is a container format which can contain disk related information, and VHDx files which can be mounted and used as a regular disk are easily created. Volumes such as NTFS/ReFS/FAT32 or any file system which the OS supports on the mounted disk can also be created. Differencing VHDx's can be created which will have internal references to parent VHDx.

In an EMC Networker block based backup system, the backup process creates a full and incremental backup of a target volume by copying all or only changed blocks of the target volume into the VHDx format. The software module creates a VHDx stream which contains all the VHDx related metadata and the disk metadata such as MBR, GPT and the volume contents on the fly, which will then be streamed to the backup medium (disk) targets as a single stream. The resulting saveset can then be mounted which will contain the volume to be backed up for recovery purposes. The resulting VHDx file contains only one volume, which makes it easier to chain incremental backups of a particular volume, which will be linked to its parent.

The VHDx format specifies certain data elements and formats, such as a Block Allocation Table (BAT). Blocks are of two types: payload and sector bitmap. Payload blocks contain virtual disk payload data, while sector bitmap blocks contain parts of the sector bitmap. Payload blocks are the size of the BlockSize field defined by the VHDX file parameter field and can be virtually indexed. The payload block 0 contains the first BlockSize bytes of the virtual disk, and the payload block 1 contains the second BlockSize bytes of the virtual disk, and so on. The sector bitmap blocks are 1 MB in size, and can be virtually indexed in a similar manner. Thus, the sector bitmap block 0 contains the first 1 MB of the sector bitmap, sector bitmap block 1 contains the second 1 MB of the sector bitmap, and so on. Each sector bitmap block contains a bit for each logical sector in the file, representing whether the corresponding virtual disk sector is present in this file. Bit 0 (bit 0 of byte 0) is the entry for the first virtual sector, bit 1 is the entry for the second, and so on. For each bit, a value of 1 indicates that the payload data for the corresponding virtual sector should be retrieved from this file, while a value of zero indicates that the data should be retrieved from the parent VHDX file.

The number of sectors that can be described in each sector bitmap block is $2^{23}$, so the number of bytes described by a single sector bitmap block is $2^{23}$ times the logical sector size. This value is known as the chunk size. A virtually contiguous, chunk-size aligned and chunk-sized portion of the virtual disk is known as a chunk. The chunk ratio is the number of payload blocks in a chunk, or equivalently, the number of payload blocks per sector bitmap block. The chunk ratio can thus be expressed mathematically as follows by Equation 1:

$$\text{Chunk Ratio} = \frac{2^{23} * LogicalSectorSize}{BlockSize} \qquad [1]$$

In the VHDx format, the block allocation table (BAT) is a region consisting of a single array of 64-bit values, with an entry for each block that determines the state and file offset of that block. The entries for the payload block and sector bitmap block are interleaved in a way that the sector bitmap block entry associated with a chunk follows the entries for the payload blocks in that chunk. FIG. 2 illustrates an example BAT layout where the payload blocks are denoted PB and the sector bitmap blocks are denoted SB. FIG. 2 illustrates an example BAT with interleaved PB and SB blocks for the case in which the chunk ratio is four. In this case, an SB block is interleaved after every four PB block, as shown in the figure.

Volume Partitioning

In an embodiment, the volume partitioning process uses the BAT structure of VHDx to divide each volume into sub volumes of 64 TB each and stored each sub volume as an individual VHDx. This mechanism is used for full and incremental backups FIG. 3 illustrates the division of a volume into 64 TB VHDx sub-volumes during a level full backup under some embodiments. As shown in diagram 300 of FIG. 3, each full volume is divided into individual 64 TB sub-volumes and each sub volume is stored in a separate VHDx. Thus, sub-volume 1 goes from 0 TB to 64 TB and is denoted VHDx-1, sub-volume 2 goes from 65 TB to 128 TB and is denoted VHDx-2, sub-volume 3 goes from 129 TB to 192 TB and is denoted VHDx-3, and so on. For the example of FIG. 3, when reading a block from the source volume, if the block lies in the 0 TB-64 TB range, it is stored in the 1$^{st}$ VHDx (VHDx-1), if the block lies in the (65 TB-128 TB) range, it is stored in the 2$^{nd}$ VHDx (VHDx-2), and so on.

Each VHDx shall have a corresponding saveset and cover set managing these individual save sets. The cover set acts like a container capsule for all the sub volume VHDx. Thus, as shown in FIG. 3, the container (or cover set) 300 includes the four sub-volumes VHDx-1 to VHDx-4. Any practical number of sub-volumes may be included depending on the size of the entire source volume with each sub-volume maximized at 64 TB, under present VHDx embodiments. Since each individual sub-volume VHDx is of size 64 TB, the number of VHDx that will be created for a given total volume size can be derived from the following formula (Equation 2):

Number of VHDx=(Total Volume Size)/(64 TB) [2]

For example, if the volume size is 256 TB, then process 116 will create four VHDx files for every 64 TB region during the level full back up as shown in the example of FIG. 3. The above equation 2 is used if the total volume size (divide by 64) is zero. In an embodiment, the number of VHDx that we shall create can be derived from the following formula (Equation 3) if the total volume size (divide by 64) is nonzero:

Number of VHDx=((Total Volume Size)/(64 TB))+ (1) [3]

Figure 5:
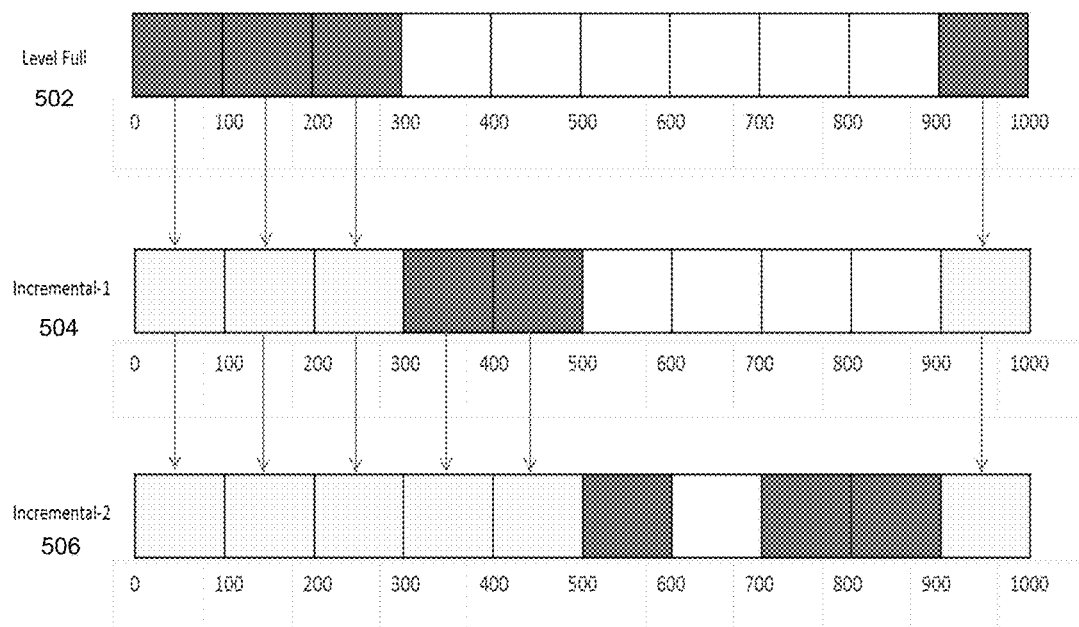
FIG. 5 illustrates a method of creating virtual synthetic full backups in a Data Domain backup system under some embodiments.

During incremental backups, each of the individual savesets of the sub volume VHDx generated as part of full backup will have a corresponding saveset. These savesets might be empty if there is no block changed in the respective 64 TB region. In this case, there will be zero data block extents. In the case where backup device is a Data Domain device, a virtual synthetic feature is available, and the changed blocks will be combined to form a new full (virtual synthetic) backup for every 64 TB. In general, synthetic backups are created from a full backup of a file and subsequent incremental backups, where the incremental backup backs up only changed information in the file. FIG. 5 illustrates a method of creating virtual synthetic full backups in a Data Domain backup system under some embodiments. As shown in FIG. 5, during synthetic full backup, the previous full backup 502 and the subsequent incremental backups 504 and 506 are combined to form a new, full back up. The new, full synthetic backup is an accurate representation of the clients' file system at the time of the most recent full backup. The backup software instructs the DD platform that the incremental backup contains these changed blocks and all other blocks should get it from the previous backup.

During incremental backups, the process creates virtual full backups for every 64 TB region. Blocks that belong to the range (0-64 TB) should merge with the VHDx created in the same range, blocks in the range (65 TB-128 TB) should merge with the parent VHDx created in the (65 TB-128 TB) range, and so on. The result will be a single virtual synthetic full back up in this entire block range. FIG. 4 illustrates the division of a volume into 64 TB VHDx sub-volumes during an incremental backup under some embodiments. In this example diagram, the entire volume size is 256 TB and the container or cover set 400 includes four individual virtual synthetic full backup VHDx sub-volumes denoted VHDx-1 to VHDx-4 that each contain 64 TB virtual backups in respective extent ranges.

Figure 6:
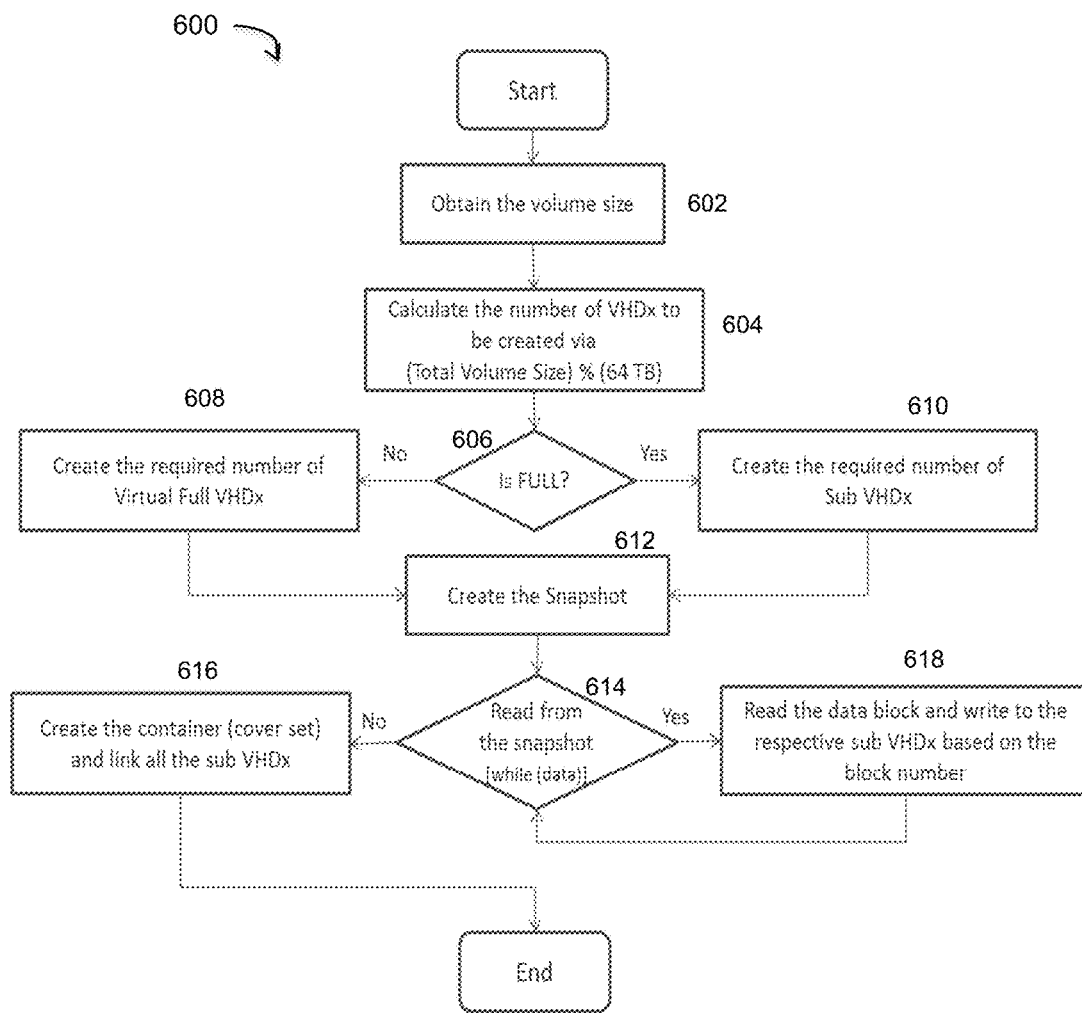
FIG. 6 illustrates a method of volume partitioning into 64 TB VHDx sub volumes during level full backups under some embodiments.

FIG. 6 illustrates a method of volume partitioning into 64 TB VHDx sub volumes during level full backups under some embodiments. Process 600 of FIG. 6 begins with the system obtaining the overall or total volume size, step 602. This can be obtained by reading the appropriate file system parameter or through a discovery process to discover the entire extent of the entire source volume. It then calculates the number of VHDx sub-volumes to create through the formula given by Equation 2 above.

As part of level full backups, the process creates a VHDx sub-volume for every 64 TB of an entire source volume, as shown in FIG. 3. the process also creates empty VHDx sub-volumes which do not contain any data block extent in case if there are no used blocks in the selected 64 TB range. For example, if the volume size is 256 TB and used blocks size is 60 TB then it will create four VHDx files and 60 TB data blocks are distributed based on the block number. Block number from 0 to 64 TB will go to the first; 64 TB to 128 TB will go to the second and so on. In case there is no used block in a particular 64 TB region, the process creates an empty VHDx by making all BAT entries NULL for that sub-volume.

In decision block 606, the process determines whether or not the backup procedure is full or not (incremental). If not, the process creates the required number of virtual full VHDx sub-volumes, such as shown in FIG. 4, step 608. If it is full, the process creates the required number of parent or full VHDx sub-volumes, such as shown in FIG. 3, step 610. The backup process then creates the snapshot backups of the volume, step 612. In decision block 614, the process determines whether or not there is data read from the snapshot. If not, the process creates the container (cover set) and links all the VHDx sub-volumes, step 616. If there is a data read from the snapshot, the process reads the data block and writes to the respective VHDx sub-volume based on the block number. This process loop iterates until there is no further data read from the snapshot, and ends after the container is created (616).

As part of incremental backups, process creates the virtual full VHDx file in the same fashion as it did in level full backup. For every group, the process creates one virtual full VHDx file in the respective block range, as shown in FIG. 4.

After a backup operation, such as either level full (FIG. 3) or virtual synthetic (FIG. 4), a recovery procedure may eventually be performed to restore the system in the event of a data corruption or system failure event. During such a recovery operation, the system shall mount all of the individual VHDx sub-volumes together since each individual VHDx file cannot be mounted by itself since they do not by themselves have complete volume information. In an embodiment, backup management process 112 includes a mount driver that accommodates the over 64 TB volume partitioning method, such as illustrated in FIGS. 3 and 4. In an embodiment, the mount driver opens storage device file handles for all the savesets. For the example savesets VHDx-1 to VHDx-4 of FIG. 3, there will be four open file handles, which are grouped based on each individual block range. While recovering, the mount driver will get read requests at random blocks. The mount driver identifies which VHDx file each block read request belongs to and redirects the request to the respective VHDx file.

Figure 7:
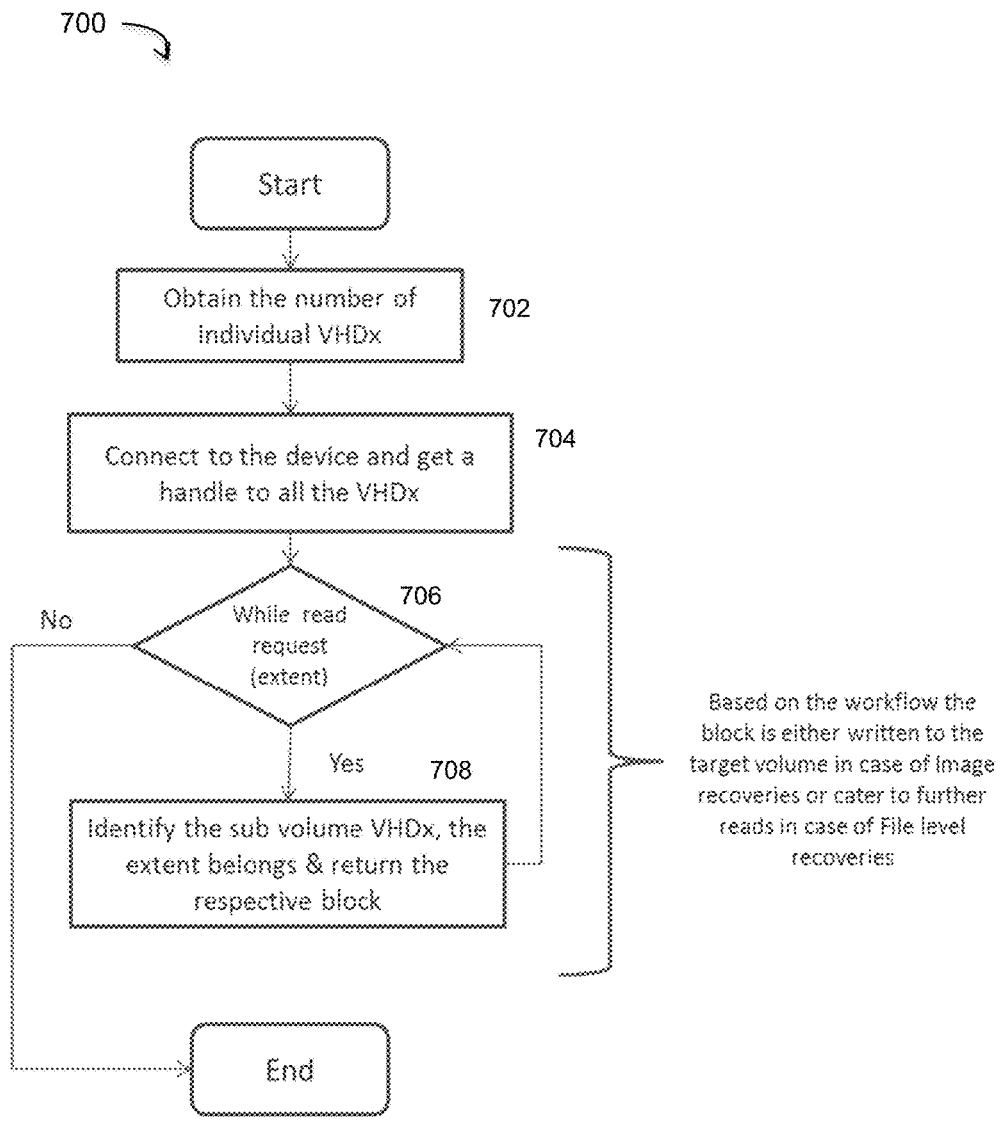
FIG. 7 illustrates a method of recovering VHDx sub volumes under some embodiments.

FIG. 7 illustrates a method of recovering VHDx sub volumes under some embodiments. With respect to disaster recovery (DR), each column in FIG. 3 can be viewed as one group. In this case, there are four groups in the container 300. If the protected volume size is less than 64 TB, then there will be only one group. Current block based solutions handle only one group, however embodiments described herein extend the block based backup system to have multiple groups instead of a single group. To perform recovery using this mechanism, the backup manager 112 recovers blocks from all groups in parallel by opening handle to all the individual VHDx. Thus, as shown in flow diagram 700, the process starts by obtaining the number if individual VHDx sub-volumes, step 702. It obtains a list of all the used blocks from the VHDx files opened by connecting to the device to get a handle to all the VHDx sub-volumes, step 704. In decision block 706, the process determines whether a read request is pending. If not the process 700 ends. Otherwise for a read request, the process identifies the sub-volume VHDx, the extent belongs, and returns the respective block, step 708. By reading all the used blocks from the individual VHDx sub-volumes in parallel it writes the same block back to the target volume. The block is written to the target volume in the case of image recoveries, or the process loop of 706 and 708 services further reads in the case of file level recoveries.

Although some specific flows are presented in flowchart or flow diagram form, it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

Figure 8:
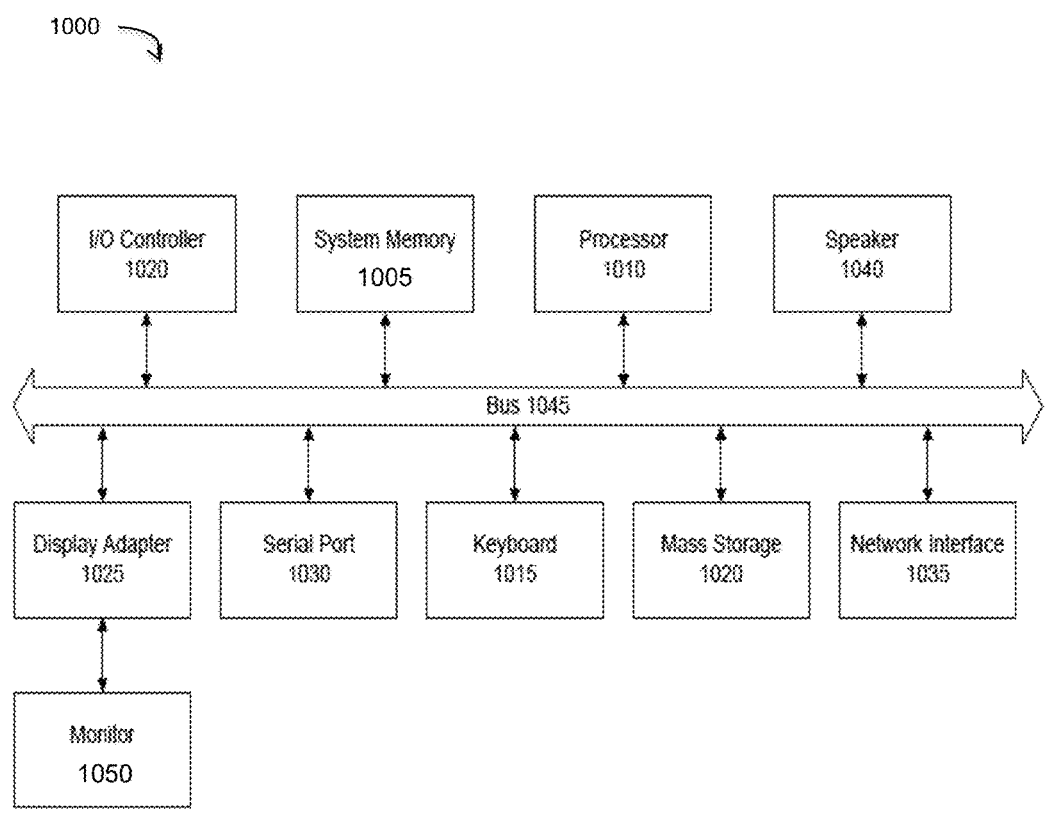
FIG. 8 shows a system block diagram of a computer system used to execute one or more software components of the present system described herein.

The network environment of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1000 includes a monitor 1050, keyboard 1015, and mass storage devices 1020. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, non-native applications. For example, client can access the system through a web application from one or more servers using a network connection with the server or servers and load the web application in a web browser. For example, a web application can be downloaded from an application server over the Internet by a web browser. Non-native applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing block based backups for large-scale source volumes, comprising:
    obtaining a total source volume size to determine if the source volume exceeds 64 TB;
    creating a number of sub-volumes to divide the total source volume into discrete sub-volumes of 64 TB each;
    grouping the discrete sub-volumes into a container; and
    storing, upon a read operation for a block based backup operation, each block of the source volume into a corresponding sub-volume of the sub-volumes.

2. The method of claim 1 further comprising determining a block number and offset of each block and determining the corresponding sub-volume from the offset.

3. The method of claim 2 wherein each sub-volume represents an individual saveset of the backup operation, and wherein the container manages the individual saveset for the block based backup operation.

4. The method of claim 1 wherein the block based backups are part of a data domain backup system.

5. The method of claim 4 wherein the source volume comprises virtual hard disk files formatted as a Virtual Hard Disk Image (VHD).

6. The method of claim 5 wherein the backup operation comprises one of a full backup, and incremental backup, and a virtual synthetic full backup, wherein the virtual synthetic full backup comprises a previous full backup and the subsequent incremental backups to form a new full backup.

7. The method of claim 6 wherein, for incremental and virtual synthetic full backups, the method further comprises creating one virtual VHD file in each corresponding sub-volume.

8. The method of claim 1 further comprising:
    performing a recovery operation after the storing of each block; and
    performing a data recovery operation for the source volume by mounting all the corresponding sub-volumes together using a mount driver component.

9. The method of claim 8 wherein the mount driver component opens a storage device handle for each of the corresponding sub-volumes.

10. The method of claim 8 wherein the recovery operation further comprises:
   reading all used blocks from the corresponding sub-volumes in parallel; and
   writing same blocks back to a target volume.

11. The method of claim 1 wherein the source volume is of a total size of 256 TB (terabytes) and a first sub-volume of the sub-volumes extends from 0 to 64 TB, a second sub-volume of the sub-volumes extends from 65 TB to 128 TB, a third sub-volume of the sub-volumes extends from 129 TB to 192 TB, and a fourth sub-volume of the sub-volumes extends from 193 TB to 256 TB.

12. A system comprising a processor-based executable module configured perform block based backups for large-scale source volumes, comprising:
   an agent process obtaining a total source volume size to determine if the source volume exceeds 64 TB;
   a partitioning component creating a number of sub-volumes to divide the total source volume into discrete sub-volumes of 64 TB each;
   a grouper grouping the discrete sub-volumes into a container; and
   a hardware backup component storing, upon a read operation for a block based backup operation, each block of the source volume into a corresponding sub-volume of the sub-volumes.

13. The system of claim 12 wherein the partitioning component determines a block number and offset of each block and determines the corresponding sub-volume from the offset, and wherein each sub-volume represents an individual saveset of the backup operation, and wherein the container manages the individual saveset for the block based backup operation.

14. The system of claim 13 wherein the backup component comprises at least part of a data domain backup system, and wherein the source volume comprises virtual hard disk files formatted as a Virtual Hard Disk Image (VHDx).

15. The system of claim 14 wherein the backup operation comprises one of a full backup, and incremental backup, and a virtual synthetic full backup, wherein the virtual synthetic full backup comprises a previous full backup and the subsequent incremental backups to form a new full backup, and wherein, for incremental and virtual synthetic full backups, the method further comprises creating one virtual VHDx file in each corresponding sub-volume.

16. The system of claim 12 further comprising:
   a recovery component performing a recovery operation after the storing of each block; and
   a mount driver component performing a data recovery operation for the source volume by mounting all the corresponding sub-volumes together, wherein the mount driver component opens a storage device handle for each of the corresponding sub-volumes.

17. The system of claim 16 wherein the recovery operation comprises:
   reading all used blocks from the corresponding sub-volumes in parallel; and
   writing same blocks back to a target volume.

18. The system of claim 12 wherein the source volume is of a total size of 256 TB (terabytes) and a first sub-volume of the sub-volumes extends from 0 to 64 TB, a second sub-volume of the sub-volumes extends from 65 TB to 128 TB, a third sub-volume of the sub-volumes extends from 129 TB to 192 TB, and a fourth sub-volume of the sub-volumes extends from 193 TB to 256 TB.

19. A computer program product, comprising a non-transitory computer-readable medium having a computer-readable program code embodied therein, the computer-readable program code adapted to be executed by one or more processors to implement a method for performing block based backups for large-scale source volumes, by:
   obtaining a total source volume size to determine if the source volume exceeds 64 TB;
   creating a number of sub-volumes to divide the total source volume into discrete sub-volumes of 64 TB each;
   grouping the discrete sub-volumes into a container; and
   storing, upon a read operation for a block based backup operation, each block of the source volume into a corresponding sub-volume of the sub-volumes.

20. The computer program product of claim 19 wherein the method further comprises determining a block number and offset of each block and determining the corresponding sub-volume from the offset, and wherein each sub-volume represents an individual saveset of the backup operation, and wherein the container manages the individual saveset for the block based backup operation.

* * * * *